(No Model.)
T. LLOYD.
BURNISHER.
No. 485,416. Patented Nov. 1, 1892.
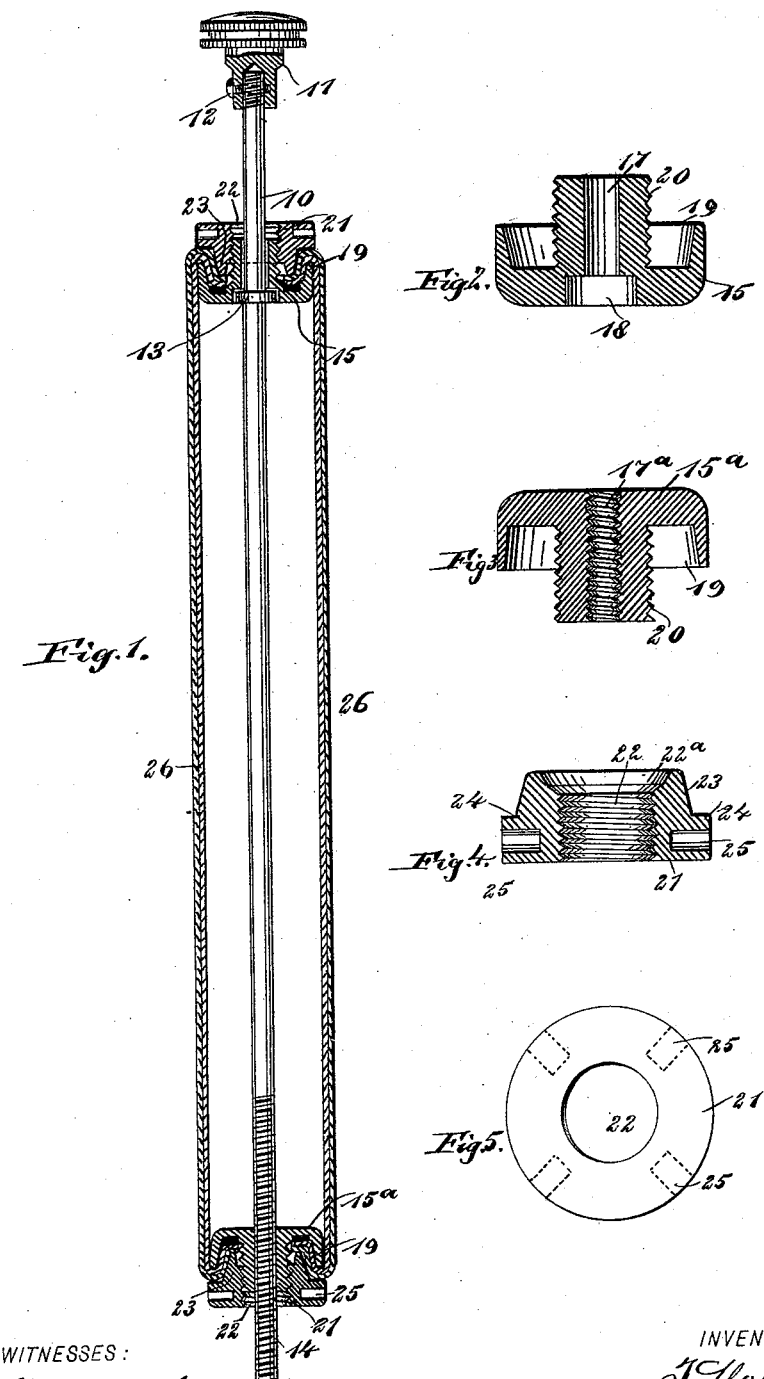

UNITED STATES PATENT OFFICE.

THOMAS LLOYD, OF BOSTON, MASSACHUSETTS.

BURNISHER.

SPECIFICATION forming part of Letters Patent No. 485,416, dated November 1, 1892.

Application filed January 7, 1892. Serial No. 417,270. (No model.)

*To all whom it may concern:*

Be it known that I, THOMAS LLOYD, of Boston, in the county of Suffolk and State of Massachusetts, have invented a new and Improved Burnisher, of which the following is a full, clear, and exact description.

My invention relates to improvements in burnishers; and the object of my invention is to produce a simple and efficient burnisher which may be used to advantage for burnishing boots and shoes, stoves, and hot articles of various kinds, and also all kinds of metallic wear.

A further object of my invention is to provide a convenient means of tightening the rubbing-surface of the burnisher, so that it may always do the most efficient work.

To this end my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1 is a longitudinal section of the burnisher embodying my invention. Fig. 2 is an enlarged detail view of one of the inner end nuts. Fig. 3 is a detail sectional view of the opposite inner end nut. Fig. 4 is a detail sectional view of one of the outer jam-nuts, and Fig. 5 is a plan view of the same.

The burnisher has a central rod 10, which runs longitudinally through it, and on one end of the rod is a knob 11, which serves as a handle, and which has a milled edge to enable it to be easily turned, and the knob has a shank which is screwed to the rod and which is also held in place by a transverse screw 12. Near the handled end of the rod is a fixed collar 13, and the opposite end of the rod is screw-threaded, as shown at 14. Near opposite ends of the rods are inner nuts 15 and 15$^a$, to which the rubbing portion of the body is fastened, as hereinafter described, and the nut 15 has a central bore 17 to enable it to be applied to the rod, a recess 18 on its inner side, which is adapted to receive the collar 13, a flange 19 around one edge and on the outer side, which forms a cup-like recess between itself and the central hub 20 of the nut, in which recess the web or rubbing portion of the burnisher is held, as described below. The hub or shank 20 of the nut is elongated and is exteriorly screw-threaded to enable the jam-nut to be screwed to place thereon. The nut 15$^a$ is substantially like the nut 15, it having a central hub 20 and the flange 19; but the recess 18 is dispensed with, and the bore 17$^a$ of the nut is screw-threaded, so as to fit the thread 14 of the rod 10, and both nuts 15 and 15$^a$ are provided with rubber washers, as shown in Fig. 1. At each end of the body portion of the device is a jam-nut 21, having a threaded bore 22, adapted to fit the exterior thread on the hub 20 of both the inner nuts, and this bore terminates at one end in a recess 22$^a$, which provides space for the ends of the body or web of the burnisher. Each nut 21 has a tapering or conoidal portion 23, adapted to fit in the cup-like recesses of the nuts 15 and 15$^a$, and this conoidal portion terminates at its base in a shoulder 24, and the body of the nut is provided with transverse holes 25, in which a key may be inserted to turn the nuts. The nuts 15, 15$^a$, and 21 are adapted to hold in place the web or burnishing-body 26 of the burnisher, which body, as shown in the drawings, is made of a double thickness of tubular webbing; but it may be made of any desired flexible material, according to the use to which it is to be put.

To fasten the webbing or body in place, the ends are doubled over the nuts 15 and 15$^a$, so as to project into the cup-like recesses thereof, and the jam-nuts 21 are then screwed firmly upon the nuts 15 and 15$^a$, so that the conoidal portions 23 of the jam-nuts will be forced upon the doubled ends of the web 26, and will thus hold it securely in place. To get the necessary tightness in the web or body, the rod 10 may be turned by means of its handle 11, so as to advance the nut 15$^a$ toward the free end of the rod 10, and the webbing will thus be stretched. This tool is used by rubbing it back and forth over the article to be burnished or polished, and this may be done either by hand or by suitable machinery.

As before remarked, the nature of the body depends upon the use to which the article is to be put. For instance, for polishing shoes, furniture, or any ordinary article common webbing may be used, which may be saturated with a suitable polisher, and if the burnisher is to be used for polishing metal goods the body 26 thereof may be made of fine wire-netting. For use upon stoves or hot articles the body may be made of asbestus cloth, and, if desired, the body may consist of a spiral spring carried by the rod and having bristles held between the coils thereof.

The burnisher may be used as a razor-strop, and its exterior surface may be suitably prepared for the purpose, or it may be interiorly charged with charcoal, so that it will have a suitable burnishing effect on various articles. It will also be seen that the outer surface of the burnisher may be prepared with ground emery, so that it may be used advantageously on metallic wear.

Having thus described my invention, I claim as new and desire to secure by Letters Patent—

1. The combination, with a burnisher-tube of flexible material having a head separate and independent thereof secured concentrically in each of its ends, of a screw-tension mechanism for forcing the heads apart and stretching the tube to increase its tension, substantially as set forth.

2. The combination, with a burnishing-tube having a two-part clamping-head at each end, the members or jaws of each head clamping between them one edge of the tube, the said two heads being provided, respectively, with a threaded and a plain aperture, of the shouldered rod passed through said apertures and threaded to engage the threaded aperture to force the two heads apart to stretch the tube, substantially as set forth.

3. In a burnisher, a holder comprising a rod having a shoulder near one end and screw-threaded at its opposite end, a clamp on the threaded end of the rod, formed of two nuts adjustable one upon the other to clamp one end of the burnisher, and a second clamp on the other end of the rod outside of the collar and comprising, also, two parts adjustable one upon the other to clamp the opposite end of a burnisher, substantially as set forth.

4. A burnisher comprising a handled rod having one end screw-threaded and having a collar near the opposite end, inner nuts mounted, respectively, on the collar and on the threaded end of the rod, said nuts having cup-like recesses in their outer faces and having, also, exteriorly-screw-threaded hubs, jam-nuts having projections to fit the recesses of the inner nuts and having bores threaded to fit the hubs of the inner nuts, and a flexible body having its ends held between the jam-nuts and inner nuts, substantially as described.

THOMAS LLOYD.

Witnesses:
 CHISTOPHER MAAS,
 LOUIS P. OBER, Jr.